INVENTOR.
CURTIS L. SWAN

United States Patent Office 3,429,567
Patented Feb. 25, 1969

3,429,567
CLAMP FOR ASSEMBLING RADIATORS
Curtis L. Swan, 1501 Highway 44,
Redding, Calif. 96001
Filed May 23, 1966, Ser. No. 552,141
U.S. Cl. 269—156                            3 Claims
Int. Cl. B25b 1/06, 5/06; B23k 37/04

ABSTRACT OF THE DISCLOSURE

An assembly jig for clamping a tank to one end of a radiator core while the soldering operation seals the tank and core together. The clamp includes relatively wide jaw faces to distribute the clamping pressure over a large area of the core faces.

---

This invention relates to a device for holding certain elements in a predetermined relation during the assembly thereof, and more particularly to a clamp for holding the core and tank of a vehicular radiator in predetermined relation without the necessity of continued attendance on the part of the operator so that the operator may devote his entire energies to the soldering operation connecting the parts together.

Radiators used in water cooled vehicles operate as a heat exchanger between a moving body of heated liquid and a stream of moving air of a temperature less than that of the liquid. Radiators of this type generally comprise a core consisting of a plurality of vertically extending tubes having heat exchanging fins on the periphery thereof and a pair of liquid collecting tanks at each end of the core. In repairing or reconditioning used radiators it is necessary to remove the liquid collecting tanks which is normally accomplished by melting the solder connecting the core to the tanks or by severing the connection therebetween as by the use of a cutting torch. The vertical conduits comprising the core are then cleaned by a suitable apparatus with the tanks being re-soldered to the core at the completion of the cleaning operation. The soldering operation is presently performed by placing the core on a suitable workbench or on the ground, holding the tank on the upper end of the core with one hand and manipulating the soldering iron with the other. Since solder is generally provided in a spool which must be held by one hand, it will be seen that the operator must hold the tank and the solder spool with the same hand which is a manifest inconvenience. Accordingly, the operator usually calls on an assistant to hold the tank while the soldering operation progresses to the point that a holding of the tank is no longer required.

In brief terms, the instant invention comprises a clamp for holding the core and tank of a vehicular radiator together so that an operator may affix the two together as by soldering or the like. Structurally, the invention comprises a pair of pivoted arms each of which carries a foot for abutting the core and a plate perpendicular to the planes of the feet for holding the tank on top of the core. Preferably, the feet are pivotally mounted on the arms to remain parallel with the core regardless of the width of the core being soldered. Likewise, the abutting plate is preferably spring biased toward the feet to accommodate tanks of various external configuration and to apply pressure on the tank as it is being soldered to the core.

It is accordingly a primary object of the instant invention to provide a clamp for assembling radiators that is constructed and arranged to hold the core and the tank in a vertical predetermined relation.

Another object of the instant invention is to provide a tank for assembling vehicular radiators which is provided with a pair of pivoted arms carrying pivotally mounted feet thereon so that the clamp may be easily removed from any particular core and which will accommodate cores of varying thickness.

Still another object of the instant invention is to provide a clamp facilitating the assembly of one element on top of another including a pair of spaced apart yet pivotally mounted arms so that opposite sides of the lowermost element may be grasped including means for exerting down pressure on the uppermost element.

A further object of the instant invention is to provide a clamp facilitating the assembly of vehicular radiators which is inexpensive to make, which is easy to use and which has a minimum number of operating parts thereby conducing to long life.

Other objects and advantages of the instant invention reside in the combination of elements, arrangements of parts, and features of construction and utilization, all as will be more fully pointed out hereinafter and disclosed in the accompanying drawing wherein there is shown a preferred embodiment of this inventive concept.

In the drawing:

FIGURE 2 is a side elevational view of the radiator and radiator assembly clamp of FIGURE 1;

Figure 1:
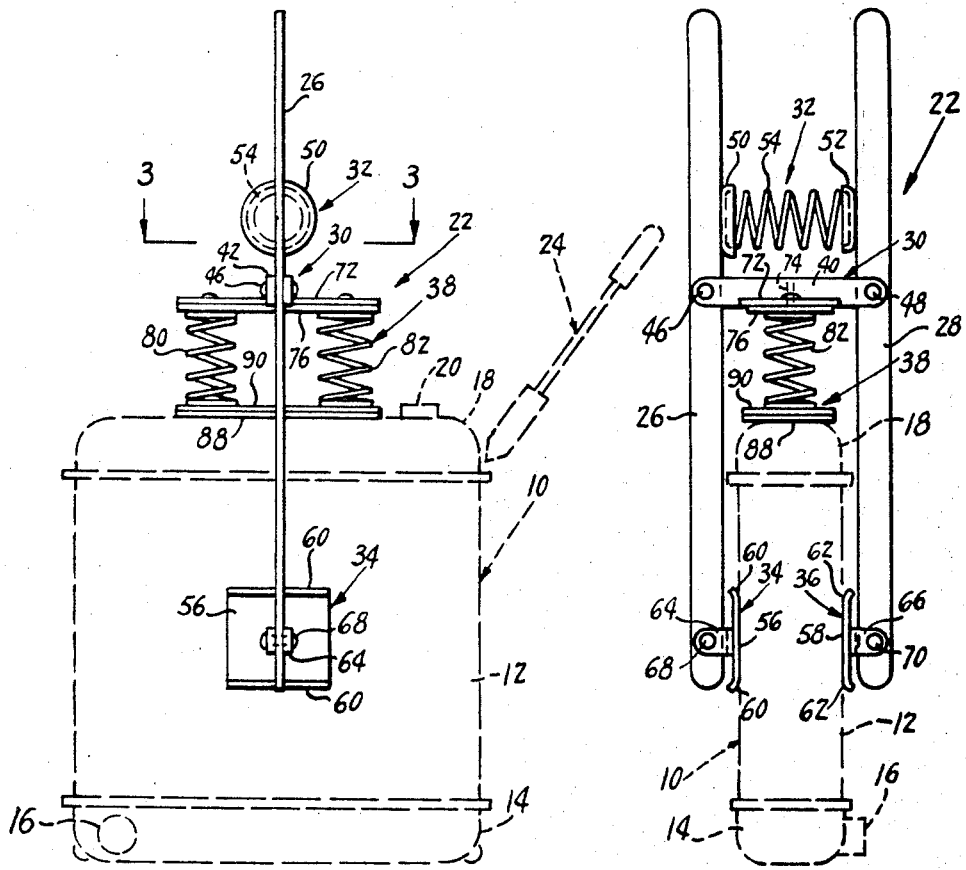
FIGURE 1 is a front elevational view of the radiator assembly clamp of the instant invention secured in operative relation to a vehicular radiator illustrated in dashed lines.
Figure 3:
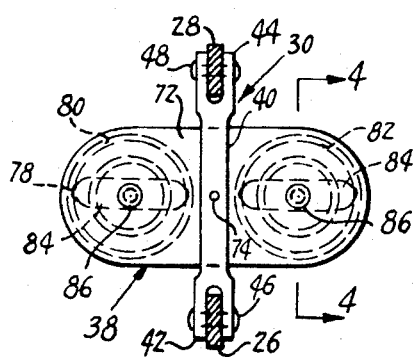
Figure 4:
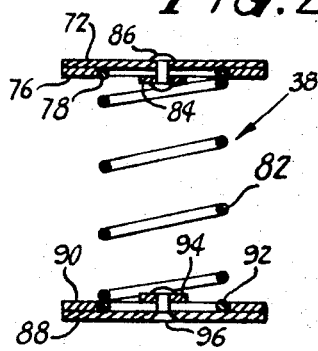

FIGURE 3 is a transverse horizontal cross-sectional view of the radiator clamp of FIGURES 1 and 2 taken substantially along line 3—3 of FIGURE 1 as viewed in the direction indicated by the arrows; and FIGURE 4 is a vertical longitudinal cross-sectional view of the radiator clamp of FIGURES 1 to 3 inclusive, taken substantially along line 4—4 of FIGURE 3 as viewed in the direction indicated by the arrows.

Referring now to the drawing in detail, wherein like reference characters designate like elements throughout the several views thereof, a conventional vehicular radiator is illustrated generally at 10 comprised of a central core 12 having a plurality of vertical liquid transporting condits equipped with heat exchanging fins, a lowermost liquid retaining tank 14 having an outlet 16, and an uppermost liquid retaining tank 18 having an inlet 20. It should be understood, however, that radiator 10 may be of any conventional type provided with any number of inlets and outlets.

A radiator assembly clamp of the instant invention is illustrated generally at 22 for temporarily holding core 12 and uppermost tank 18 together during the period that a soldering iron shown generally at 24 is used to secure tank 18 to core 12. Clamp 22 has as its major components a pair of arms 26, 28 pivotally interconnected by a mounting means shown generally at 30 and biased by a spring means shown generally at 32 to place a pair of feet shown generally at 34, 36 into engagement with the sides of core 12. An abutment member shown generally at 38 provides down pressure on tank 18 during the welding operation.

During the assembly of radiator 10, core 12 is placed in a vertical position with tank 18 resting thereon. The operator grasps the ends of arms 26, 28 and forces them together thereby spreading feet 34, 36 to receive core 12 therein as shown in FIGURE 2. The operator then moves clamp 22 downwardly until abutment member 38 contacts tank 18 thereby holding it in position and then releases the pressure on arms 26, 28. In conducting the soldering operation, using any kind of blow pipes using oxygen and acetylene or natural gas and compressed air, the operator may grasp soldering iron 24 with one hand and the conventional spool of solder with the other and make necessary connections between the separate conduits comprising core 12 and tank 18.

Arms 26, 28 are illustrated as flat, straight, elongate bars although it should be understood that they may be of any suitable shape or configuration. Mounting means 30 includes a transverse bar 40 having a pair of bifurcated ends 42, 44 respectively receiving arms 26, 28 as shown in FIGURE 3. A suitable pivot pin 46, 48 respectively connects each of arms 26, 28 in bifurcated ends 42, 44. Although ends 46, 48 are illustrated as rivets, it should be readily apparent that many types of fasteners may be used. Although arms, 26, 28 may be bowed to the center and interconnected by a suitable pin, mounting means 30 has been found preferable since the components may be purchased out of stock and since bar 40 provides a convenient supporting element for abutment member 38.

Spring means 32 includes a substantially circular cup 50, 52 respectively affixed in any suitable manner to arms 26, 28 and receiving a helical spring 54 therebetween. Spring 54 is preferably fixedly secured to the interior of cups 50, 52 to avoid inadvertant dislogement thereof although this is not required because the generally convex cavity of cups 50, 52 tend to retain spring 54 in place. Spring means 32 is placed above mounting means 30 to avoid interference with abutment member 38 and radiator 10 although it should be apparent that many different arrangements may be utilized to avoid this interference. Helical spring 54 is normally in compression to bias feet 34, 36 into engagement with core 12 thereby retaining clamp 22 on radiator 10 without the continued attention of the operator.

Feet 34, 36 include a flat plate 56, 58 upturned at each end to form smooth edges 60, 62 thereby minimizing the possibility of damaging the heat exchanging fins of core 12. In addition, plates 56, 58 should be at least one inch in cross-sectional area and preferably between five and ten inches in cross-sectional area to provide a large area of contact between feet 34, 36 and core 12 again minimizing damage thereto. Affixed adjacent the center of each plate 56, 58 is a bifurcated support 64, 66 respectively receiving each of arms 26, 28. A suitable pivot pin 68, 70 interconnects supports 64, 66 with arms 26, 28.

It should be noted that feet 34, 36 are pivoted to arms 26, 28 a substantial distance above the lowermost end thereof to retain plates 56, 58 in the inwardly facing position shown when clamp 22 is removed from the operative position illustrated in FIGURES 1 and 2. This is preferable since feet 34, 36 would otherwise pivot into a non-facing relationship upon the removal of clamp 22 thereby requiring the operator's attention when using clamp 22 on a subsequent radiator to insure the inward facing of feet 34, 36.

Abutment member 38 includes a plate 72 transverse with respect to arms 26, 28 and bar 40 connected to bar 40 by a suitable fastener 74 as shown in FIGURE 3. A second plate 76 underlies first plate 72 and forms a pair of aligned cutouts 78 in each of which reside a helical spring 80, 82. As shown best in FIGURE 4, springs 80, 82 are secured to plate 72 by a transverse bar 84 extending under the first coil of springs 80, 82 and held thereagainst by a removable fastener 86 such as a screw threadably received in bar 84.

The lower end of abutment member 38 is substantially the same as the upper end thereof and comprises a tank engaging plate 88 underlying a second plate 90 forming a pair of spaced apart cutouts 92 reveiving the lower end of spring 82. A transverse bar 94 and a countersunk fastener 96 secure spring 82 to plate 88.

After clamp 22 has been inserted over tank 18 and core 12, plate 88 engages the upper surface of tank 18 thereby holding it in place. If it is desired to exert a greater force on tank 18 the operator may depress arms 26, 28 slightly thereby compressing springs 80, 82. Because of the large area of contact between core 12 and plates 56, 58 and the biasing forces produced by spring means 32, springs 80, 82 will remain in compression thereby increasing the force holding tank 18 and core 12 together. After the operator has soldered a portion of the interface of core 12 and tank 18, he may remove clamp 22 and thereafter complete the soldering operation.

It is now seen that there is herein provided an improved radiator assembly clamp which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:
1. A clamp for holding the core and tank of a radiator together during assembly comprising:
   a pair of relatively straight elongated arms for straddling the tank and a portion of the core;
   said arms arranged in spaced apart generally parallel relation;
   a bar having bifurcated ends extending generally perpendicularly to said arms with one of said arms pivotally mounted in each of the bifurcated ends of said bar;
   a pair of feet, each foot pivotally mounted adjacent the end of one of the arms, in juxtaposed face-to-face relation for abutting the sides of the core;
   a cup mounted on each of said arms on the end portions thereof opposite said feet, said cups arranged in aligned face-to-face relation;
   a coil spring having its opposite ends engaged in said cups for biasing the arms to clamp the feet to the opposite faces of the radiator core;
   a first plate, affixed to the bar at right angles thereto and at right angles to the arms on the side of said bar adjacent said feet;
   at least one spring affixed to the first plate and extending toward the feet; and
   a second plate mounted on the lower end of the spring for engaging the tank of the radiator holding the tank on the core when the arms are positioned to straddle the tank and core and the feet abut the core.

2. The clamp of claim 1 wherein the abutment means further includes
   a third plate, affixed to the first plate, forming a cut-out closely receiving the end of the spring;
   a bar sandwiching the first coil of the spring against the first plate; and
   a fastener securing the bar to the first plate.

3. The clamp of claim 1 wherein the pivotal connection between each foot and the arm is located a distance above the lowermost end of the arm at least as great as the distance between the lowermost end of the foot and the pivotal connection maintaining the feet in face-to-face relation.

References Cited

UNITED STATES PATENTS 3,263,535   8/1966   Zurcher _____ 269—156 X

FOREIGN PATENTS 566,754   11/1923   France.

ROBERT C. RIORDON, *Primary Examiner.*

D. R. MELTON, *Assistant Examiner.*

U.S. Cl. X.R.

269—254